(12) United States Patent
Sugata

(10) Patent No.: US 12,100,390 B2
(45) Date of Patent: Sep. 24, 2024

(54) SPEECH EVALUATION SYSTEM, SPEECH EVALUATION METHOD, AND NON-TRANSITORY COMPUTER READABLE MEDIUM STORING PROGRAM

(71) Applicant: TOYOTA JIDOSHA KABUSHIKI KAISHA, Toyota (JP)

(72) Inventor: Hikaru Sugata, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 367 days.

(21) Appl. No.: 17/528,359

(22) Filed: Nov. 17, 2021

(65) Prior Publication Data

US 2022/0157299 A1 May 19, 2022

(30) Foreign Application Priority Data

Nov. 19, 2020 (JP) ................................ 2020-192345

(51) Int. Cl.
*G10L 25/63* (2013.01)
*G10L 15/08* (2006.01)

(52) U.S. Cl.
CPC .................................. *G10L 15/08* (2013.01)

(58) Field of Classification Search
None
See application file for complete search history.

(56) References Cited

U.S. PATENT DOCUMENTS

| | | | | |
|---|---|---|---|---|
| 9,564,128 | B2* | 2/2017 | Park | G10L 25/78 |
| 10,621,985 | B2* | 4/2020 | Joh | G10L 15/22 |
| 11,409,360 | B1* | 8/2022 | Brimijoin, II | H04R 5/04 |
| 2004/0243416 | A1* | 12/2004 | Gardos | G10L 15/25 |
| | | | | 704/275 |
| 2019/0394247 | A1* | 12/2019 | Garg | H04L 65/403 |

FOREIGN PATENT DOCUMENTS

| | | |
|---|---|---|
| JP | 5267995 B2 | 8/2013 |
| JP | 2016-103081 A | 6/2016 |
| JP | 2016-157388 A | 9/2016 |

* cited by examiner

*Primary Examiner* — Pierre Louis Desir
*Assistant Examiner* — Kristen Michelle Masters
(74) *Attorney, Agent, or Firm* — Dinsmore & Shohl LLP

(57) ABSTRACT

A speech detection unit detects a speech in communication based on output values of microphones of a plurality of wearable terminals, and identifies a wearable terminal corresponding to the detected speech. A speech period detection unit detects for each speech a start timing of the speech and an end timing thereof. An evaluation-value calculation unit calculates, for each speech detected by the speech detection unit, an evaluation value for the speech based on an output value of an acceleration sensor of a wearable terminal other than the wearable terminal corresponding to the speech in an evaluation period from a first timing, which is at or later than the start timing of the speech and earlier than the end timing of the speech, to a second timing, which is later than the end timing of the speech.

7 Claims, 11 Drawing Sheets

| TERMINAL ID:1 | TIME DATA: 16:52:23 | VOICE DATA: [......] | ACCELERATION DATA: [.....] |

| | | | |
|---|---|---|---|
| TERMINAL ID:2 | TIME DATA: 16:52:23 | VOICE DATA: {......} | ACCELERATION DATA: {......} ~14a |
| TERMINAL ID:3 | TIME DATA: 16:52:23 | VOICE DATA: {......} | ACCELERATION DATA: {......} ~14a |
| TERMINAL ID:1 | TIME DATA: 16:52:23 | VOICE DATA: {......} | ACCELERATION DATA: {......} ~14a |
| TERMINAL ID:3 | TIME DATA: 16:52:24 | VOICE DATA: {......} | ACCELERATION DATA: {......} ~14a |
| TERMINAL ID:1 | TIME DATA: 16:52:24 | VOICE DATA: {......} | ACCELERATION DATA: {......} ~14a |
| TERMINAL ID:2 | TIME DATA: 16:52:24 | | |
| ....... | ....... | ....... | ....... |

Fig. 5

| SPEECH ID | SPEECH TIME | VOICE DATA | EVALUATION VALUE |
|---|---|---|---|
| a | t1 | a_t1.mp3 | 4.8 |
| b | t4 | b_t4.mp3 | 0.7 |
| c | t6 | c_t6.mp3 | 6.1 |
| d | t8 | d_t8.mp3 | 1.1 |
| ⋮ | ⋮ | ⋮ | ⋮ |

Fig. 9

SPEECH EVALUATION SYSTEM, SPEECH EVALUATION METHOD, AND NON-TRANSITORY COMPUTER READABLE MEDIUM STORING PROGRAM

CROSS REFERENCE TO RELATED APPLICATIONS

This application is based upon and claims the benefit of priority from Japanese patent application No. 2020-192345, filed on Nov. 19, 2020, the disclosure of which is incorporated herein in its entirety by reference.

BACKGROUND

The present disclosure relates to a speech evaluation system, a speech evaluation method, and a program.

There has been a demand that, in communication among a plurality of participants, an important speech that is particularly convincing to listeners be able to be extracted from among individual speeches made by the plurality of participants.

As a technology of this kind, there is a technology disclosed in Patent Literature 1 (Japanese Unexamined Patent Application Publication No. 2016-103081), in which, in conversational communication in which a plurality of users participate, the number of times of nodding by listeners is counted by using a wearable terminal worn by a specific speaker while the specific speaker is speaking, and a listener acceptance level for the specific speaker is calculated based on a value that is obtained by dividing the counted number of times of nodding by the listeners by the duration of the conversation of the specific speaker (paragraphs 0080 and 0093). Further, according to this technology, it is considered that higher the listener acceptance level is, the more the conversation has been accepted by the listeners.

SUMMARY

In the technology disclosed in Patent Literature 1, there is room for improvement in terms of the detection accuracy of evaluations of speeches.

An object of the present disclosure is to provide a technology for accurately determining an evaluation value for each speech in communication among a plurality of participants.

A first exemplary aspect is a speech evaluation system configured to obtain an evaluation value for each speech in communication among a plurality of participants, including: a plurality of wearable terminals, each of the plurality of wearable terminals being adapted to be worn by a respective one of the plurality of participants and including a sensor including at least a sound-collecting unit; a speech detection unit configured to detect a speech in the communication based on output values of the sound-collecting units of the plurality of wearable terminals, and identifies a wearable terminal corresponding to the detected speech; a speech period detection unit configured to detect, for each speech detected by the speech detection unit, a start timing of the speech and an end timing thereof; and an evaluation-value calculation unit configured to calculate, for each speech detected by the speech detection unit, an evaluation value for the speech based on an output value of the sensor of a wearable terminal other than the wearable terminal corresponding to the speech in a speech evaluation period from a first timing to a second timing, the first timing being at or later than the start timing of the speech and earlier than the end timing of the speech, and the second timing being later than the end timing of the speech. According to the above-described configuration, the reaction of a listener to a speech that occurs at a timing delayed from the speech as well as the reaction of the listener occurring during the speech is taken into consideration in the calculation of an evaluation value for the speech. Therefore, it is possible to accurately calculate an evaluation value for each speech. The second timing may be set to a timing that is a predetermined time after the end timing of the corresponding speech. According to the above-described configuration, the calculation required to set the second timing is simplified, so that the second timing can be set at a low cost.

The second timing may be set to a timing at which another speech following the corresponding speech starts. According to the above-described configuration, an evaluation value can be calculated while excluding responses to the other speech, so that it is possible to accurately calculate the evaluation value for the corresponding speech.

The second timing may be set to a timing that is a predetermined time after the end timing of the corresponding speech. When, following the corresponding speech, another speech starts before the predetermined time elapses from the end timing of the corresponding speech, the second timing may be set to a timing at which the other speech following the corresponding speech starts. According to the above-described configuration, when no speech starts, following the corresponding speech, before the predetermined time elapses from the end timing of the corresponding speech, the second timing can be set at a low cost. Further, when, following the corresponding speech, another speech starts before the predetermined time elapses from the end timing of the corresponding speech, an evaluation value can be calculated while excluding responses to the other speech, so that it is possible to accurately calculate the evaluation value for the corresponding speech.

The sensor may include an acceleration sensor.

When an output value of the acceleration sensor indicates a vertical shaking motion of a head of a participant wearing the corresponding wearable terminal, the evaluation-value calculation unit may calculate an evaluation value for the corresponding speech so that the evaluation value is raised.

When an output value of the acceleration sensor indicates a horizontal shaking motion of a head of a participant wearing the corresponding wearable terminal, the evaluation-value calculation unit may calculate an evaluation value for the corresponding speech so that the evaluation value is lowered.

A second exemplary aspect is a speech evaluation method for obtaining an evaluation value for each speech in communication among a plurality of participants, each of the plurality of participants wearing a respective one of a plurality of wearable terminals, each of the plurality of wearable terminals including a sensor including at least a sound-collecting unit, the speech evaluation method including: detecting a speech in the communication based on output values of the sound-collecting units of the plurality of wearable terminals, and identifying a wearable terminal corresponding to the detected speech; detecting, for each detected speech, a start timing of the speech and an end timing thereof; and calculating, for each detected speech, an evaluation value for the speech based on an output value of the sensor of a wearable terminal other than the wearable terminal corresponding to the speech in a speech evaluation period from a first timing to a second timing, the first timing being at or later than the start timing of the speech and earlier than the end timing of the speech, and the second timing being later than the end timing of the speech. According to the above-described method, the reaction of a listener to a speech that occurs at a timing delayed from the speech as well as the reaction of the listener occurring during the speech is taken into consideration in the calculation of an evaluation value for the speech. Therefore, it is possible to accurately calculate an evaluation value for each speech.

Further, another exemplary aspect is a program for causing a computer to perform the above-described speech evaluation method.

According to the present disclosure, the reaction of a listener to a speech that occurs at a timing delayed from the speech as well as the reaction of the listener occurring during the speech is taken into consideration in the calculation of an evaluation value for the speech. Therefore, it is possible to accurately calculate an evaluation value for each speech.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 3 shows an example of a structure of transmission data;

FIG. 5 shows transmission data accumulated in an evaluation apparatus;

FIG. 9 shows an example of a structure of evaluation data;

DESCRIPTION OF EMBODIMENTS

Figure 1:
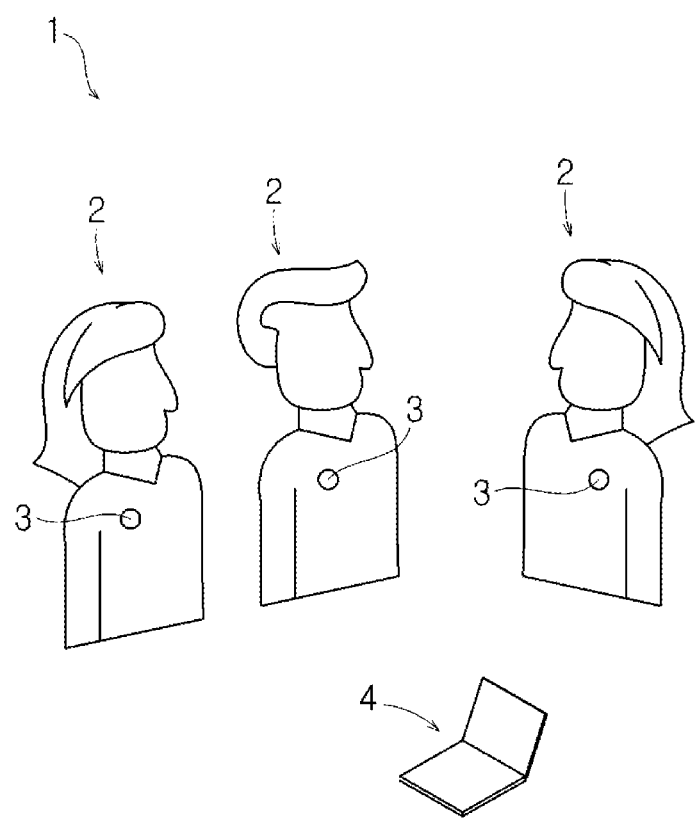
FIG. 1 is a schematic diagram of a speech evaluation system.

The present disclosure will be described hereinafter through embodiments according to the disclosure. However, they are not intended to limit the scope of the present disclosure according to the claims. Further, not all of the components/structures described in the embodiments are necessarily indispensable for solving the problem. For clarifying the explanations, the following descriptions and the drawings are partially omitted and simplified as appropriate. The same reference numerals (or symbols) are assigned to the same elements throughout the drawings, and redundant descriptions thereof are omitted as appropriate.

FIG. 1 shows a schematic diagram of a speech evaluation system 1. The speech evaluation system 1 is a system for determining an evaluation value for each speech in communication among a plurality of participants 2. The speech evaluation system 1 includes a plurality of wearable terminals 3 and an evaluation apparatus 4.

In this embodiment, the number of participants 2 who participate in the same communication is three. However, the number of participants who participate in the same communication is not limited to three, and may be two, or four or more, for example, ten. The communication is typically conversational communication that is established by speeches made by the participants thereof. Examples of this type of communication include a debate, a round-table discussion, and a workshop (or seminar) meeting. However, the communication is not limited to those in which all participants meet in the same real space. That is, the communication can also include those in which all participants meet in an online virtual space.

(Wearable Terminal 3)

As shown in FIG. 1, each of the plurality of wearable terminals 3 is worn by (or attached to) and used by a respective one of the plurality of participants 2. That is, one participant 2 wears one wearable terminal 3. In this embodiment, each of the wearable terminals 3 is a badge that can be detachably attached to a top (i.e., an upper garment) worn on the upper body of a respective one of the participants 2, and attached to a place above the pit of the stomach of the participant 2. However, instead of in the form of the badge, each of the wearable terminals 3 may be a headset, an earphone(s), glasses, a necklace, a pendant, or the like.

Figure 2:
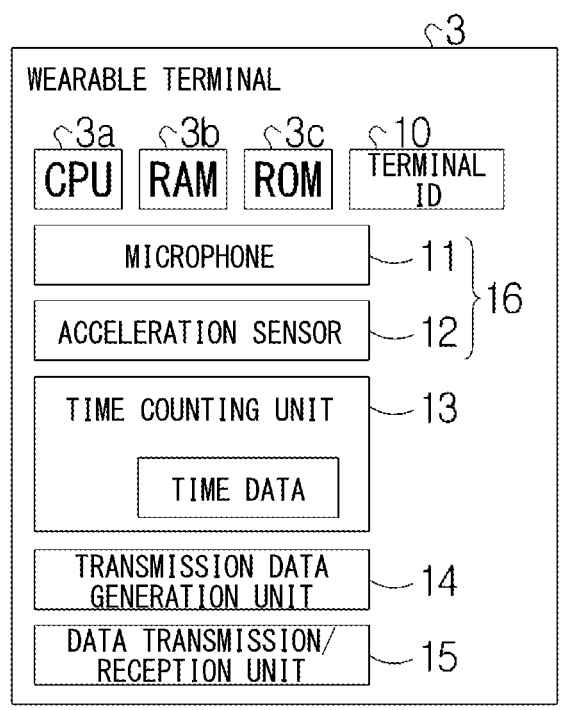
FIG. 2 is a functional block diagram of a wearable terminal.

FIG. 2 shows a functional block diagram of each of the wearable terminals 3. As shown in FIG. 2, the wearable terminal 3 includes a terminal-ID information storage unit 10, a microphone 11, and an acceleration sensor 12. The wearable terminal 3 further includes a CPU (Central Processing Unit) 3a as a central processing unit, a readable/writable RAM (Random Access Memory) 3b, and a read-only ROM (Read Only Memory) 3c. Further, as the CPU 3a loads and executes a control program stored in the ROM 3c, and the control program causes hardware such as the CPU 3a to function as a time counting unit 13, a transmission data generation unit 14, and a data transmission/reception unit 15. Each of the wearable terminals 3 can perform two-way radio communication with the evaluation apparatus 4 through the data transmission/reception unit 15.

The terminal-ID information storage unit 10 stores terminal-ID information for identifying a corresponding wearable terminal 3 from other wearable terminals 3. A typical example of the terminal-ID information is a MAC address unique to each wearable terminal 3. However, the terminal-ID information may be a number, a sting of letters, or a combination thereof which is set by the evaluation apparatus 4 when the wearable terminal 3 is started up. In this embodiment, the terminal-ID information is a natural number which is set by the evaluation apparatus 4 when the wearable terminal 3 is started up.

The microphone 11 is a specific example of the sound-collecting unit, and converts a sound around the corresponding wearable terminal 3 into a voltage value and outputs the obtained voltage value to the transmission data generation unit 14.

The acceleration sensor 12 converts three-axis accelerations (i.e., acceleration components on the three axes) of the corresponding wearable terminal 3 into voltage values and outputs the obtained voltage values to the transmission data generation unit 14. When a participant 2 wearing the corresponding wearable terminal 3 shakes his/her head "vertically", the upper body of that participant 2 repeats flection (i.e., bending) and extension (i.e., stretching) around the roll axis (an axis parallel to the axis connecting the left and right shoulders). Therefore, in this case, among the output values of the acceleration sensor 12, the vertical component value fluctuates in such a manner that it repeatedly increases and decreases within a predetermined range. On the other hand, when the participant 2 wearing the corresponding wearable terminal 3 shakes his/her head "horizontally", the upper body of the participant 2 repeats twisting around the yaw axis (an axis parallel to the direction in which the backbone extends). Therefore, in this case, among the output values of the acceleration sensor 12, the output value corresponding to the horizontal component value fluctuates in such a manner that it repeatedly increases and decreases within a predetermined range.

The microphone 11 and the acceleration sensor 12 constitute a sensor 16 for detecting a speech of the participant 2 wearing the corresponding wearable terminal 3. However, the acceleration sensor 12 can be omitted.

The time counting unit 13 holds time data, increments the time data, which is initialized by a predetermined method, in a predetermined cycle, and outputs the time data to the transmission data generation unit 14. The time data held by the time counting unit 13 is typically initialized by time data received from the evaluation apparatus 4. Alternatively, the time data held by the time counting unit 13 may be initialized by having the corresponding wearable terminal 3 access the Network Time Protocol (NTP) through the evaluation apparatus 4 and the Internet, and thereby obtain the latest time data.

The transmission data generation unit 14 generates transmission data 14*a* shown in FIG. 3 at predetermined intervals. As shown in FIG. 3, the transmission data 14*a* includes terminal-ID information, time data, voice data, and acceleration data. The predetermined interval is typically one second. The voice data is an output value of the microphone 11 that is output in a period from the time indicated by the time data to one second after that time. Similarly, the acceleration data is an output value of the acceleration sensor 12 that is output in the period from the time indicated by the time data to one second after that time.

Referring to FIG. 2 again, the data transmission/reception unit 15 transmits the transmission data 14*a* to the evaluation apparatus 4. In this embodiment, the data transmission/reception unit 15 transmits the transmission data 14*a* to the evaluation apparatus 4 through short-range radio communication such as Bluetooth®. Alternatively, the data transmission/reception unit 15 may transmit the transmission data 14*a* to the evaluation apparatus 4 through wired communication. Further, the data transmission/reception unit 15 may transmit the transmission data 14*a* to the evaluation apparatus 4 through a network such as the Internet.

(Evaluation Apparatus 4)

Figure 4:
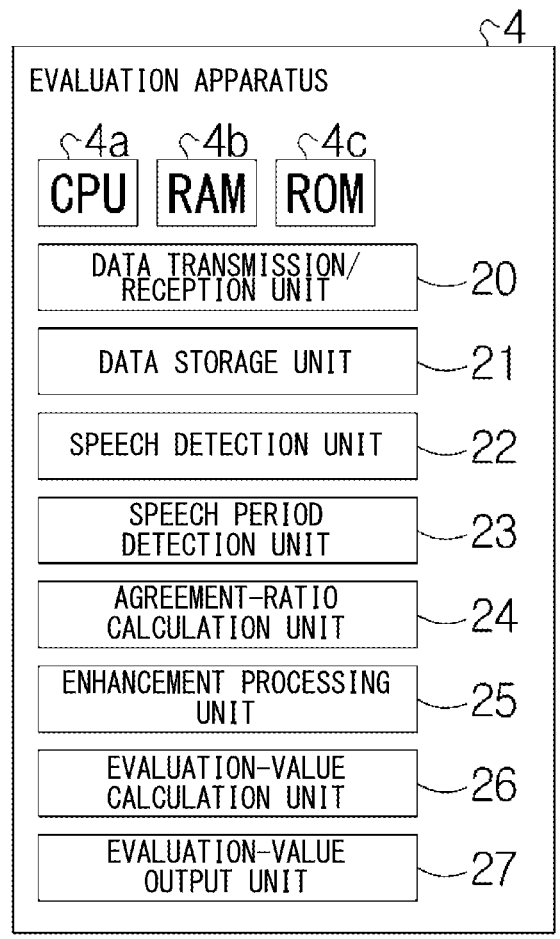
FIG. 4 is a functional block diagram of an evaluation apparatus.

FIG. 4 shows a functional block diagram of the evaluation apparatus 4. As shown in FIG. 4, the evaluation apparatus 4 includes a CPU (Central Processing Unit) 4*a* as a central processing unit, a readable/writable RAM (Random Access Memory) 4*b*, and a read-only ROM (Read Only Memory) 4*c*. Further, the CPU 4*a* loads and executes a control program stored in the ROM 4*c*, and the control program causes hardware such as the CPU 4*a* to function as a data transmission/reception unit 20, a data storage unit 21, a speech detection unit 22, a speech period detection unit 23, an agreement-ratio calculation unit 24, an enhancement processing unit 25, an evaluation-value calculation unit 26, and an evaluation-value output unit 27.

The data transmission/reception unit 20 receives transmission data 14*a* from each of the wearable terminals 3 and accumulates (i.e., stores) the received transmission data 14*a* in the data storage unit 21. FIG. 5 shows a plurality of transmission data 14*a* accumulated in the data storage unit 21. As shown in FIG. 5, a plurality of transmission data 14*a* each of which is received from one of the wearable terminals 3 are accumulated in the data storage unit 21 in the order in which they were received.

Referring to FIG. 4 again, the speech detection unit 22 detects a speech in communication based on output values of the microphones 11 of the plurality of wearable terminals 3, and identifies a wearable terminal 3 corresponding to the detected speech.

Specifically, the speech detection unit 22 analyzes voice data accumulated in the data storage unit 21. Then, when the voice data of any one of the plurality of transmission data 14*a* at a given time exceeds a predetermined value, the speech detection unit 22 detects (i.e., determines) that there was a speech in the communication at that given time and identifies a wearable terminal 3 corresponding to the detected speech by referring to the terminal-ID information of that transmission data 14*a*.

Figure 6:
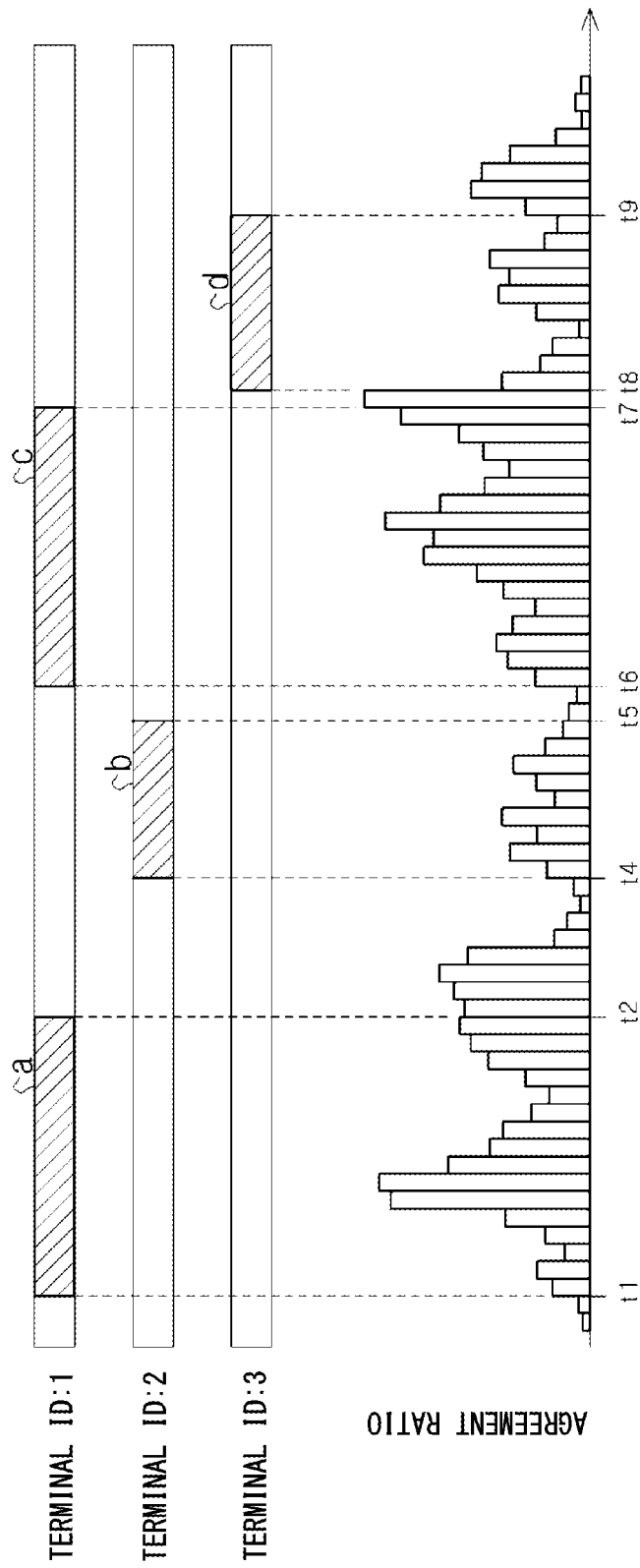
FIG. 6 is a graph showing detected speeches and agreement ratios.

FIG. 6 shows an example of speeches a, b, c and d detected by the speech detection unit 22. The horizontal axis in FIG. 6 indicates the time. The speech detection unit 22 detects the speeches a, b, c and d in this listed order in a state in which they do not overlap each other. The speeches a and c are those made by a participant 2 wearing a wearable terminal 3 having a terminal ID: 1. Similarly, the speech b is a speech made by a participant 2 wearing a wearable terminal 3 having a terminal ID: 2, and the speech d is a speech made by a participant 2 wearing a wearable terminal 3 having a terminal ID: 3.

Note that the method by which the speech detection unit 22 detects a speech and identifies a wearable terminal 3 corresponding to the detected speech is not limited to the above-described method.

For example, when voice data of any one of a plurality of transmission data 14*a* at a given time is larger than those of the other transmission data 14*a* at that given time by a predetermined amount or larger, the speech detection unit 22 can detect that there was a speech in the communication at that given time and identify a wearable terminal 3 corresponding to the detected speech by referring to the terminal-ID information of that transmission data 14*a*.

Further, the speech detection unit 22 may remove stationary noises contained in the voice data as preprocessing for detecting a speech. The stationary noises are, for example, noises caused by the operating sound of an air conditioner or ambient noises. Further, the speech detection unit 22 may remove non-stationary noises contained in the voice data as preprocessing for detecting a speech. The non-stationary noises are noises caused by, for example, a sudden loud voice uttered by a person who is not participating in the communication or noises caused by the opening/closing of a door. The above-described non-stationary noises have such a characteristic that they appear in the voice data of the plurality of transmission data 14*a* at almost the same level as each other at a given time.

Referring to FIG. 4 again, the speech period detection unit 23 detects, for each speech detected by the speech detection unit 22, a start timing of the speech and an end timing thereof. In the example shown in FIG. 6, the start timing of the speech a is a time t1 and the end timing thereof is a time t2. The start timing of speech b is a time t4 and the end timing thereof is a time t5. The start timing of speech c is a time t6 and the end timing thereof is a time t7. The start timing of speech d is a time t8 and the end timing thereof is a time t9. Note that, in this specification, the term "timing" has a concept that a point in time on the time axis is specified, and it may be a time consisting of hours, minutes, and seconds, or it may be a mere natural number that is incremented over time. Therefore, in this specification, the "timing" may be regarded as simply a "time".

Referring to FIG. 4 again, the agreement-ratio calculation unit 24 calculates an agreement ratio for each predetermined section of time (hereinafter also referred to as a predetermined time section). Note that the agreement ratio is a ratio that is obtained by dividing the number of listeners who have nodded by the number of all the listeners, and has a value between zero and one. The predetermined time section is, for example, five seconds. When this time section is too long, nodding motions performed at different timings may be regarded as nodding motions performed at the same timing, so that agreement motions for a speech may be overestimated. When this time section is too short, nodding motions performed at substantially the same timing may be regarded as nodding motions performed at different timings, so that agreement motions for a speech may be underestimated.

The agreement-ratio calculation unit 24 first calculates an agreement ratio during the speech a by referring to the accumulated transmission data 14a shown in FIG. 5. That is, the agreement-ratio calculation unit 24 analyzes acceleration data of transmission data 14a corresponding to the terminal ID: 2 during a period from the time t1 to five seconds after the time t1, and determines whether the participant 2 wearing the wearable terminal 3 corresponding to the terminal ID: 2 has performed a nodding motion. A specific example of how to determine the presence/absence of a nodding motion based on acceleration data is described below.

That is, the agreement-ratio calculation unit 24 extracts vertical component values of acceleration data during the period from the time t1 to five seconds after the time t1, calculates an average value and a standard deviation of the extracted vertical component values. Then, when the standard deviation is smaller than a predetermined value and there is a singular vertical component value(s) that has singly occurred and is deviated from the average value by a predetermined amount or larger, the agreement-ratio calculation unit 24 determines that the participant 2 wearing the wearable terminal 3 corresponding to the terminal ID: 2 has performed a nodding motion during the period from the time t1 to five seconds after the time t1. The same applies to the terminal ID: 3. The agreement-ratio calculation unit 24 repeats the above-described calculation of an agreement ratio in a similar manner after five seconds have elapsed from the time t1, and finishes the calculation at a time t4 at which another speech other than the speech a has been made.

By setting the precondition that the standard deviation of the vertical component values of acceleration data should be smaller than the predetermined value when the agreement-ratio calculation unit 24 determines the presence/absence of a nodding motion, it is possible to remove noises caused by a large motion of the participant 2 other than the nodding motion thereof, such as noises caused by a walking motion of the participant 2 and those caused as the participant 2 changes his/her posture.

In the example shown in FIG. 6, in the period from the time t1 to the time t2, the agreement ratio rises sharply once from a near-zero value, drops once, and then rises again. The agreement ratio remains constant around the time t2, and then returns to the near-zero value before the time t4.

Note that, in the example shown in FIG. 6, since there are only two listeners, the agreement ratio would be theoretically one of values 0, 0.5 and 1.0. However, in order to facilitate the understanding, the agreement ratio is gradually changed as if there are about 30 listeners.

Next, the agreement-ratio calculation unit 24 calculates an agreement ratio during the speech b. That is, the agreement-ratio calculation unit 24 analyzes acceleration data of transmission data 14a corresponding to the terminal ID: 1 during a period from the time t4 to five seconds after the time t4, and determines whether the participant 2 wearing the wearable terminal 3 corresponding to the terminal ID: 1 has performed a nodding motion. The same applies to the terminal ID: 3. The agreement-ratio calculation unit 24 repeats the above-described calculation of an agreement ratio in a similar manner after five seconds have elapsed from the time t4, and finishes the calculation at a time t6 at which another speech other than the speech b has been made.

In the example shown in FIG. 6, the agreement ratio remains at or below 0.5 in a period from the time t4 to the time t5, and is almost zero around the time t5.

The agreement-ratio calculation unit 24 calculates agreement ratios at and after the time t6 in a similar manner.

Note that as an example of other methods by which the agreement-ratio calculation unit 24 determines the presence/absence of a nodding motion, there is a method in which: vertical component values are extracted from transmission data 14a for each predetermined time section; the extracted vertical component values are input into an already-trained convolution neural network (CNN: Convolution Neural Network); and when the output value of the convolution neural network is higher than a predetermined value, it is determined that a participant 2 wearing the corresponding wearable terminal 3 has performed a nodding motion in that time section. Further, as another example of other methods by which the agreement-ratio calculation unit 24 determines the presence/absence of a nodding motion, there is a method in which: vertical component values are extracted from transmission data 14a for each predetermined time section; various feature values (such as a difference between a maximum value and a minimum values, a variance value, and a frequency distribution) of the extracted vertical component values are calculated; the calculated feature values are input to an already-trained support vector machine (SVM: Support Vector Machine); and its output values is used.

Referring to FIG. 4 again, the enhancement processing unit 25 performs an enhancement process for the agreement ratio calculated by the agreement-ratio calculation unit 24 in order to enhance the high/low of the agreement ratio. For example, the below-shown Expression (1), which is a monotonically increasing function, can be used for the enhancement process. Note that p represents an agreement ratio and k represents an adjustment parameter.

[Expression 1]

$$f(p) = \frac{e^{kp} - 1}{e^k - 1} \quad (1)$$

Figure 7:
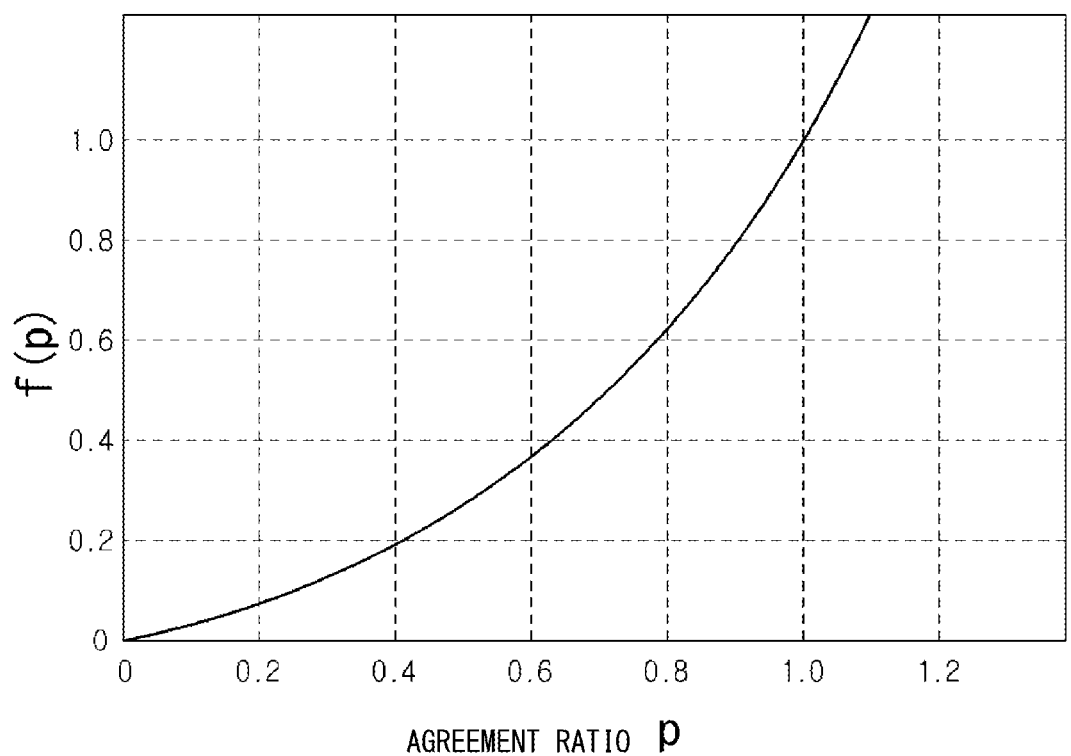
FIG. 7 is a graph showing a monotonically increasing function used in an enhancement process.

FIG. 7 shows a graph of the above-shown Expression (1) used in the enhancement process performed by the enhancement processing unit 25, where the horizontal axis indicates the agreement ratio and the vertical axis indicates the f(p) value. The larger the adjustment parameter k is, the sharper and more convex the curve drawn by the f(p) value becomes toward the lower right on the graph. According to the enhancement process by the above-shown Expression (1), when most of the listeners nod in unison, the f(p) value has a large value, and when the listeners nod sporadically at different timings, the f(p) value has a small value. By the above-described enhancement process, it is possible to make an important speech(es), for which most of the listeners nod in unison, stand out from other relatively unimportant speeches.

Figure 8:
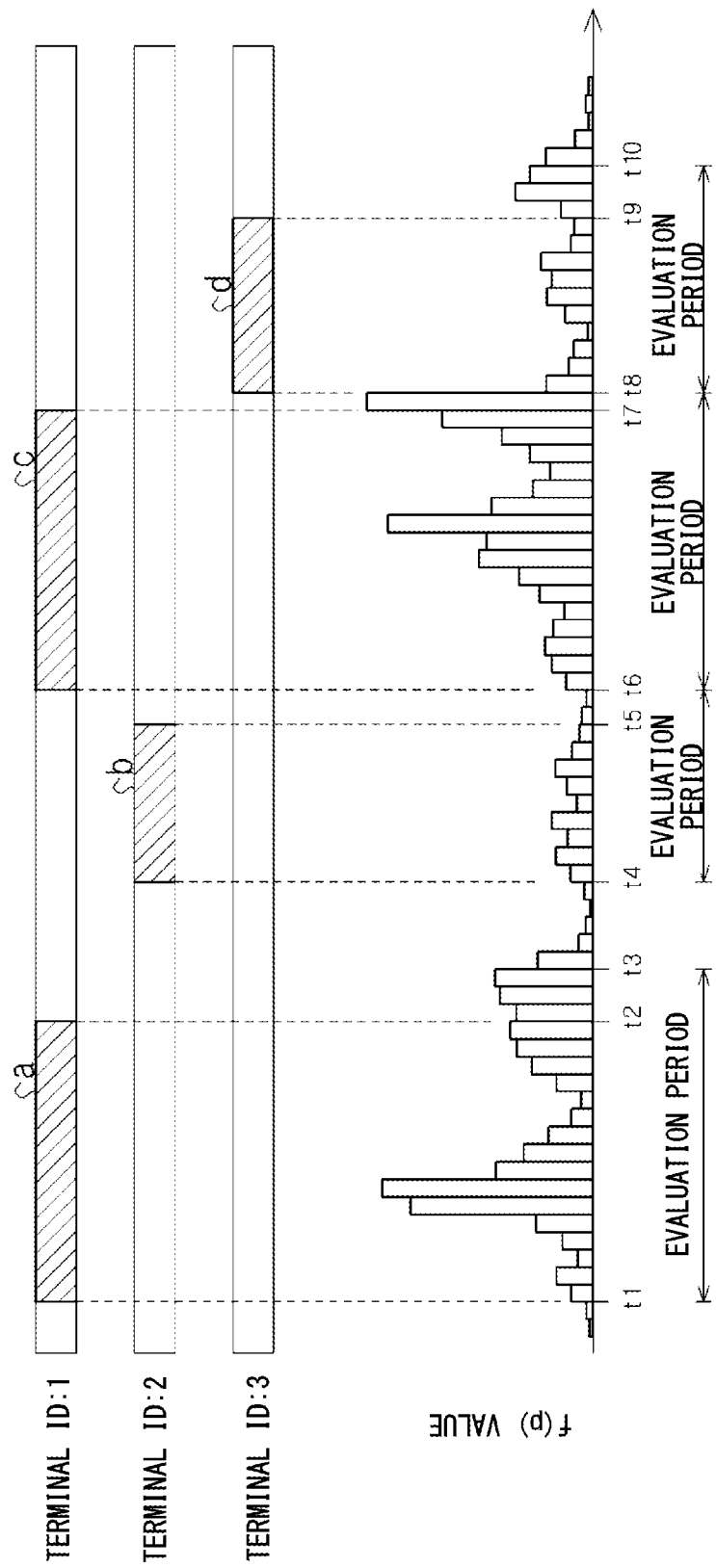
FIG. 8 is a graph showing detected speeches and f(p) values.

FIG. 8 shows f(p) values after the enhancement process. According to FIG. 8, when most of the listeners do not nod in unison, even in a time section in which a certain number of listeners have nodded, the f(p) value is compressed (i.e., reduced) by half or to a value close to zero in that time section.

The evaluation-value calculation unit 26 sets, for each speech detected by the speech detection unit 22, an evaluation period as a speech evaluation period corresponding to the speech and calculates an evaluation value for the speech.

(Speech A)

Specifically, the evaluation-value calculation unit 26 sets a start timing (a first timing) of an evaluation period corresponding to the speech a to a timing that is at or later than the time t1, which is the start timing of the speech a, and earlier than the time t2, which is the end timing of the speech a. In this embodiment, the evaluation-value calculation unit 26 sets the start timing of the evaluation period corresponding to the speech a to the time t1, which is the start timing of the speech a. Note that a nodding motion performed immediately after the start of a speech is not necessarily a nodding motion for that speech, but may be a nodding motion for another speech that was made immediately before that speech. Therefore, in order to successfully separate nodding motions for the speech a from nodding motions for the speech immediately before the speech a, the evaluation-value calculation unit 26 may set the start timing of the evaluation period corresponding to the speech a to a timing that is a predetermined time after the time t1, which is the start timing of the speech a.

Further, the evaluation-value calculation unit 26 sets an end timing (a second timing) of the evaluation period for the speech a to the time t3, which is a timing a predetermined time after the time t2, which is the end timing of the speech a. Note that the predetermined time is in a range of, for example, 5 to 15 seconds, and is set to 15 seconds in this embodiment.

Then, the evaluation-value calculation unit 26 calculates an evaluation value for the speech a by adding up f(p) values during the evaluation period corresponding to the speech a.

(Speech B)

The evaluation-value calculation unit 26 sets the start timing of the evaluation period corresponding to the speech b to the time t4.

Meanwhile, according to FIG. 8, the speech c starts before the above-described predetermined time elapses from the time t5, which is the end timing of the speech b. Therefore, if the end timing of the evaluation period corresponding to the speech b is set to a timing that is the predetermined time after the time t5 as in the case of the end timing of the evaluation period corresponding to the speech a, there is a possibility that nodding motions for the speech c may be regarded as those for the speech b. Therefore, in this case, the evaluation-value calculation unit 26 sets the end timing of the evaluation period corresponding to the speech b to the time t6 at which the speech c starts.

In the example shown in FIG. 8, although the f(p) values during the speech b are extremely low, large or somewhat large f(p) values are observed as soon as the speech c starts. It is likely that the large f(p) values immediately after the time t6 are not caused by the speech b but are caused by the speech c. Therefore, by setting the end timing of the evaluation period corresponding to the speech b to the time t6 at which the speech c starts as described above, the overestimating of the speech b is avoided.

Then, the evaluation-value calculation unit 26 calculates an evaluation value for the speech b by adding up f(p) values during the evaluation period corresponding to the speech b.

(Speech C)

The evaluation-value calculation unit 26 sets the start timing and the end timing of the evaluation period corresponding to the speech c in a manner similar to that for the speech b, and calculates an evaluation value for the speech c by adding up f(p) values during the evaluation period corresponding to the speech c.

(Speech D)

The evaluation-value calculation unit 26 sets the start timing and the end timing of the evaluation period corresponding to the speech d in a manner similar to that for the speech a, and calculates an evaluation value for the speech d by adding up f(p) values during the evaluation period corresponding to the speech d.

Then, as shown in FIG. 9, the evaluation-value calculation unit 26 stores the speeches detected by the speech detection unit 22 as evaluation data in the data storage unit 21 while associating them with the start times of these speeches, voice data thereof, and the evaluation values for these speeches. The evaluation value for a speech can be used as a useful indicator indicating the importance of that speech.

Then, the evaluation-value output unit 27 outputs evaluation data by a desired method.

By referring to the output evaluation data, the plurality of participants 2 can easily and quickly obtain voice data of highly-rated speeches that are considered to be important in the communication. Therefore, a participant 2 who intends to create the minutes of the communication can ruminate (e.g., think carefully) about the contents of the communication in a shorter time by preferentially listening to the voice data of the highly-rated speeches, and therefore can create accurate minutes in a shorter time.

Figure 10:
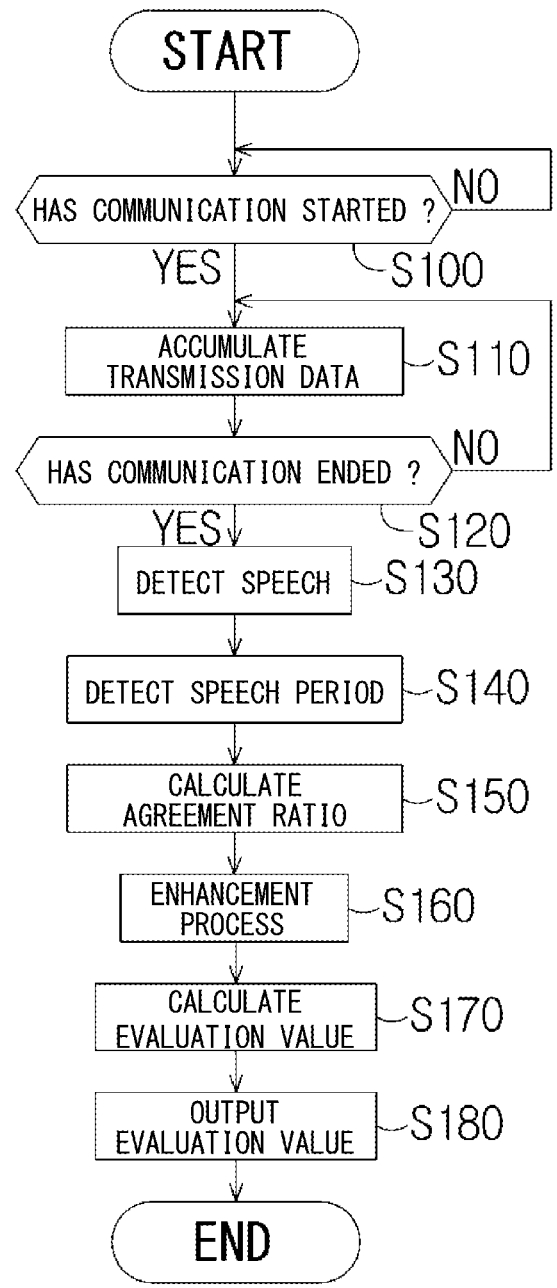
FIG. 10 shows a control flow of a speech evaluation system.

Operations performed by the speech evaluation system 1 are described hereinafter with reference to FIG. 10.

S100:

Firstly, the evaluation apparatus 4 determines whether communication among a plurality of participants 2 has started. When the evaluation apparatus 4 determines that the communication has not started (S100: No), the evaluation apparatus 4 repeats the step S100. On the other hand, when the evaluation apparatus 4 determines that the communication has started (S100: Yes), the evaluation apparatus 4 proceeds with the process to a step S110. For example, the evaluation apparatus 4 can determine that the communication has started when communication between the evaluation apparatus 4 and a plurality of wearable terminals 3 is established.

S110:

Next, the data transmission/reception unit 20 receives transmission data 14a from the plurality of wearable terminals 3 and accumulates them in the data storage unit 21.

S120:

Next, the evaluation apparatus 4 determines whether the communication among the plurality of participants 2 has ended. When the evaluation apparatus 4 determines that the communication has not ended (S120: No), the evaluation apparatus 4 returns the process to the step S110. On the other hand, when the evaluation apparatus 4 determines that the communication has ended (S120: Yes), the evaluation apparatus 4 proceeds with the process to a step S130. For example, the evaluation apparatus 4 can determine that the communication has ended when the communication between the evaluation apparatus 4 and all the wearable terminals 3 that had been in communication with the evaluation apparatus 4 is disconnected.

S130:

Next, the speech detection unit 22 detects a speech in the communication by referring to the transmission data 14a accumulated in the data storage unit 21, and identifies a wearable terminal 3 corresponding to the detected speech.

S140:

Next, the speech period detection unit 23 detects, for each speech detected by the speech detection unit 22, a start timing of the speech and an end timing thereof.

S150:

Next, the agreement-ratio calculation unit 24 calculates an agreement ratio for each predetermined time section.

S160:

Next, the enhancement processing unit 25 performs an enhancement process for the agreement ratio calculated by the agreement-ratio calculation unit 24 in order to enhance the high/low of the agreement ratio.

S170:

Next, the evaluation-value calculation unit 26 sets, for each speech detected by the speech detection unit 22, an evaluation period corresponding to the speech, and calculates an evaluation value for the speech.

S180:

Then, the evaluation-value output unit 27 outputs evaluation data by a desired method.

An embodiment according to the present disclosure has been described above, and the above-described embodiment has the below-described features.

That is, in communication among a plurality of participants 2, the speech evaluation system 1, which obtains an evaluation value for each speech, includes a plurality of wearable terminals 3, a speech detection unit 22, a speech period detection unit 23, and an evaluation-value calculation unit 26.

Each of the plurality of wearable terminals 3 is worn by a respective one of the plurality of participants 2, and includes a sensor 16 including at least a microphone 11 (a sound-collecting unit). The speech detection unit 22 detects a speech in the communication based on output values of the microphones 11 of the plurality of wearable terminals 3, and identifies a wearable terminal 3 corresponding to the detected speech. The speech period detection unit 23 detects, for each speech detected by the speech detection unit 22, a start timing of the speech and an end timing thereof. The evaluation-value calculation unit 26 calculates, for each speech detected by the speech detection unit 22, an evaluation value for the speech based on an output value of the acceleration sensor 12 of a wearable terminal 3 other than the wearable terminal 3 corresponding to the speech in an evaluation period (a speech evaluation period) from a first timing, which is at or later than the start timing of the speech and earlier than the end timing of the speech, to a second timing, which is later than the end timing of the speech. According to the above-described configuration, the reaction of a listener to a speech that occurs at a timing delayed from the speech as well as the reaction of the listener occurring during the speech is taken into consideration in the calculation of an evaluation value for the speech. Therefore, it is possible to accurately calculate an evaluation value for each speech.

Further, the second timing is set to a timing that is a predetermined time after the end timing of the corresponding speech. See, for example, the time t3 or the time t10 in FIG. 8. According to the above-described configuration, the calculation required to set the second timing is simplified, so that the second timing can be set at a low cost.

In some embodiments, the second timing is set to a timing at which another speech following the corresponding speech starts. See, for example, the time t6 and the time t8 in FIG. 8. According to the above-described configuration, an evaluation value can be calculated while excluding responses to the other speech, so that it is possible to accurately calculate the evaluation value for the corresponding speech.

Further, the second timing is set to a timing that is a predetermined time after the end timing of the corresponding speech (see the time t3 and the time t10). When another speech (the speech c or the speech d) starts, following the corresponding speech, before the predetermined time elapses from the end timing of the corresponding speech, the second timing is set to a timing at which the other speech following the corresponding speech starts. See, for example, the time t6 and the time t8 in FIG. 8. According to the above-described configuration, when no speech starts, following the corresponding speech, before the predetermined time elapses from the end timing of the corresponding speech, the second timing can be set at a low cost. Further, when, following the corresponding speech, another speech starts before the predetermined time elapses from the end timing of the corresponding speech, an evaluation value can be calculated while excluding responses to the other speech, so that it is possible to accurately calculate an evaluation value for the corresponding speech.

When the output value of the acceleration sensor 12 indicates a vertical shaking motion of a head of a participant wearing the corresponding wearable terminal 3, the evaluation-value calculation unit 26 calculates an evaluation value for the corresponding speech so that the evaluation value is raised. That is, since the vertical shaking motion of the head can be regarded as an act indicating an agreement, the corresponding speech can be considered to be relatively highly rated.

The above-described embodiment can be modified as described below.

In the above embodiment, the agreement-ratio calculation unit 24 extracts vertical component values of acceleration data and detects nodding motions of participants 2 based on the extracted vertical component values. Alternatively or additionally, the agreement-ratio calculation unit 24 may extract horizontal component values of the acceleration data and detect shaking motions of the heads of the participants 2, i.e., refusal motions, based on the extracted horizontal component values. The horizontal shaking motion of the head is a motion contradictory to the nodding motion, i.e., the vertical shaking motion of the heat, and indicates a negative and disagreeable intention to the speech. In this case, the agreement-ratio calculation unit 24 may calculate an agreement ratio so that nodding motions and refusal motions cancel each other out. Therefore, for example, when the number of participants 2 participating in communication is ten, and in a given time section, eight of them perform nodding motions and the remaining two perform refusal motions, the agreement-ratio calculation unit 24 may calculate an agreement ratio in that given time section as 0.6 ((8−2)/10=0.6). To put it briefly, the evaluation-value calculation unit 26 may calculate an evaluation value in such a manner that when the output value of the acceleration sensor 12 indicates a horizontal shaking motion of the head of a participant wearing the corresponding wearable terminal 3, the evaluation value for the corresponding speech is lowered.

In the above-described embodiment, each of the wearable terminals 3 includes an acceleration sensor 12, and the agreement-ratio calculation unit 24 calculates an agreement ratio based on the output value of the acceleration sensor 12 of each of the wearable terminals 3. However, the acceleration sensor 12 can be omitted. In this case, the agreement-ratio calculation unit 24 calculates an agreement ratio based on the output value of the microphone 11 of each of the wearable terminals 3. For example, when the microphone 11 of each of the wearable terminals 3 picks up a speech suggesting an agreement, such as "I see," "Indeed," or "That's right," the agreement-ratio calculation unit 24 can calculate an agreement ratio while regarding that speech as an expression of an agreement equivalent to the nodding motion.

Further, the evaluation apparatus 4 may be formed in a cloud system, and each of the wearable terminals 3 may communicate with the evaluation apparatus 4 through the Internet. Further, information processing performed by the evaluation apparatus 4 may be processed by a plurality of apparatuses in a distributed manner.

Figure 11:
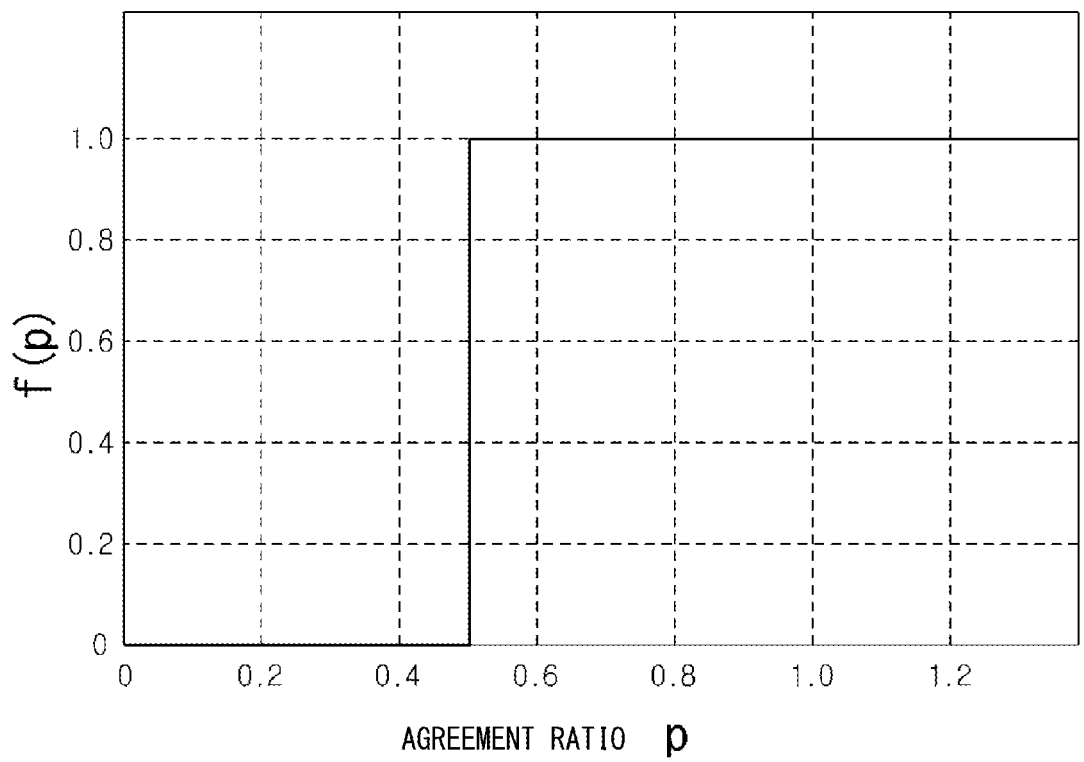
FIG. 11 is a graph showing a step function used in an enhancement process.

Further, for example, as shown in FIG. 7, in the above-described embodiment, the enhancement processing unit 25 uses a monotonically increasing function when it performs an enhancement process for the agreement ratio calculated by the agreement-ratio calculation unit 24 in order to enhance the high/low of the agreement ratio. However, as shown in FIG. 11, the enhancement processing unit 25 may instead use a step function expressed by the below-shown Expression (2) when it performs an enhancement process for the agreement ratio calculated by the agreement-ratio calculation unit 24 in order to enhance the high/low of the agreement ratio.

[Expression 2]

$$f(p) = \begin{cases} 0 & \text{if } p < 0.5 \\ 1 & \text{otherwise} \end{cases} \quad (2)$$

In the above-described example, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The evaluation apparatus 4 may perform some of the functions of each of the wearable apparatus 3, and/or at least one of the wearable terminals 3 may perform some of the functions of the evaluation apparatus 4.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A speech evaluation method for obtaining an evaluation value for each speech in communication among a plurality of participants, each of the plurality of participants wearing a respective one of a plurality of wearable terminals, each of the plurality of wearable terminals including a sensor including at least an acceleration sensor, a sound-collecting unit, the speech evaluation method comprising:
   detecting a speech in the communication based on output values of the sound-collecting units of the plurality of wearable terminals, and identifying a wearable terminal corresponding to the detected speech;
   detecting, for each detected speech, a start timing of the speech and an end timing thereof;
   calculating, for each detected speech, an evaluation value for the speech based on an output value of the sensor of a wearable terminal other than the wearable terminal corresponding to the speech in a speech evaluation period from a first timing to a second timing, the first timing being at or later than the start timing of the speech and earlier than the end timing of the speech, and the second timing being later than the end timing of the speech, in the calculating the evaluation value, when the acceleration sensor detects a vertical shaking motion of a head of a participant wearing the corresponding wearable terminal, the evaluation value for the corresponding speech is calculated so that the evaluation value is raised;
   determining the presence or absence of a nodding motion based on acceleration data from the acceleration sensor that determines an agreement ratio for a predetermined section of time; and
   determining the speech in the communication based on voice data exceeding a predetermined value.

2. The speech evaluation method according to claim 1, wherein the second timing is set to a timing that is a predetermined time after the end timing of the corresponding speech.

3. The speech evaluation method according to claim 1, wherein the second timing is set to a timing at which another speech following the corresponding speech starts.

4. The speech evaluation method according to claim 1, wherein
   the second timing is set to a timing that is a predetermined time after the end timing of the corresponding speech, and
   when, following the corresponding speech, another speech starts before the predetermined time elapses from the end timing of the corresponding speech, the second timing is set to a timing at which the other speech following the corresponding speech starts.

5. The speech evaluation method according to claim 1, wherein, in the calculating the evaluation value, when the acceleration sensor detects a horizontal shaking motion of the head of the participant wearing the corresponding wearable terminal, the evaluation value for the corresponding speech is calculated so that the evaluation value is lowered.

6. A non-transitory computer readable medium storing a program for causing a computer to perform the speech evaluation method according to claim 1.

7. A speech evaluation system configured to obtain an evaluation value for each speech in communication among a plurality of participants, comprising:
- a plurality of wearable terminals, each of the plurality of wearable terminals being adapted to be worn by a respective one of the plurality of participants and including a sensor including at least a sound-collecting unit; and
- a central processing unit configured to:
- detect a speech in the communication based on output values of the sound-collecting units of the plurality of wearable terminals, and identifies a wearable terminal corresponding to the detected speech;
- detect, for each speech detected, a start timing of the speech and an end timing thereof; and
- calculate, for each speech detected, an evaluation value for the speech based on an output value of the sensor of a wearable terminal other than the wearable terminal corresponding to the speech in a speech evaluation period from a first timing to a second timing, the first timing being at or later than the start timing of the speech and earlier than the end timing of the speech, and the second timing being later than the end timing of the speech, wherein the sensor comprises an acceleration sensor, in the calculating the evaluation value, when the acceleration sensor detects a vertical shaking motion of a head of a participant wearing the corresponding wearable terminal, the evaluation value for the corresponding speech is calculated so that the evaluation value is raised, the central processing unit is further configured to determine the presence or absence of a nodding motion based on acceleration data from the acceleration sensor that determines an agreement ratio for a predetermined section of time, and the central processing unit is further configured to determine the speech in the communication based on voice data exceeding a predetermined value.

* * * * *